Figure 1:
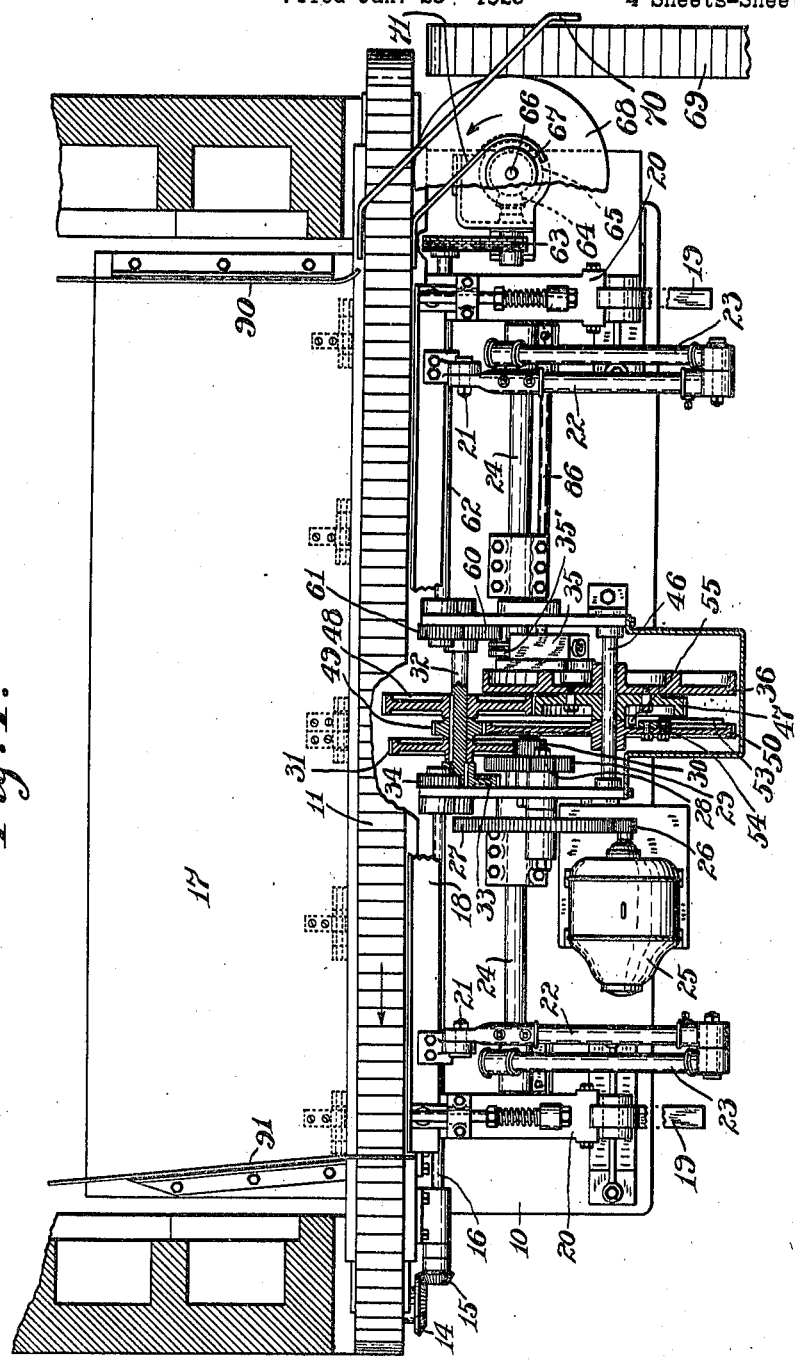

Sept. 16, 1924.

W. H. JOHNSON

LEER FEEDER

Filed Jan. 25, 1923

1,509,063

4 Sheets-Sheet 1

INVENTOR
William H. Johnson,
BY
Arthur M. Hood.
ATTORNEY

Sept. 16, 1924.
W. H. JOHNSON
LEER FEEDER
Filed Jan. 25, 1923
1,509,063
4 Sheets-Sheet 2
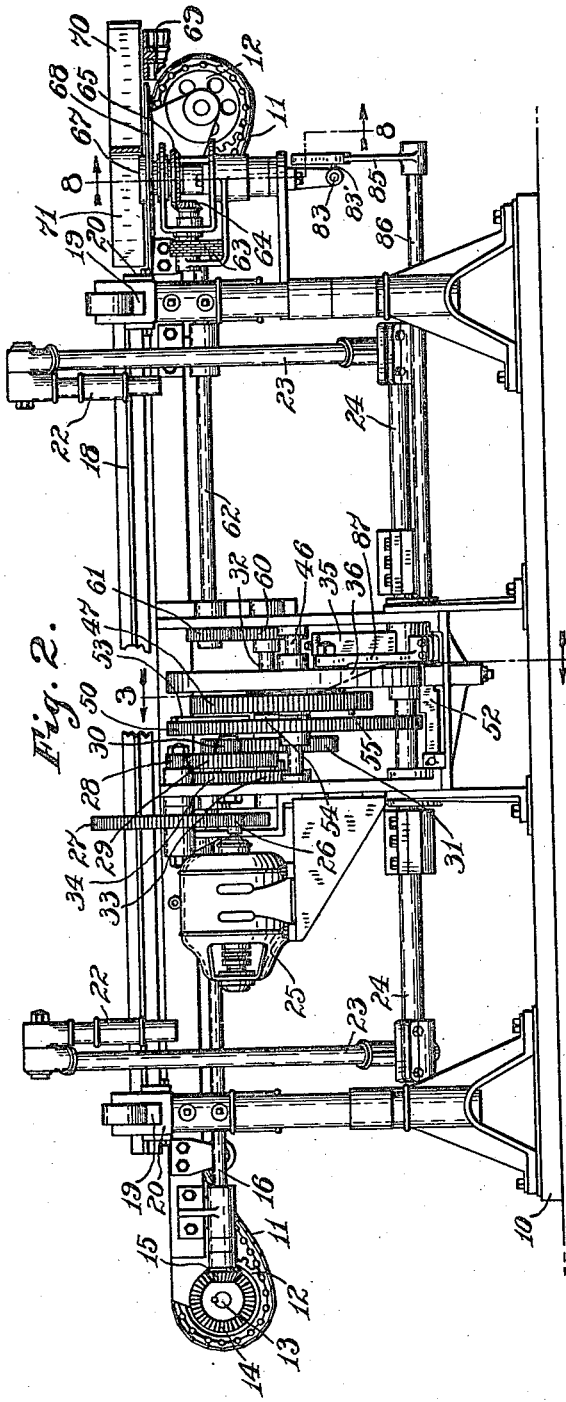
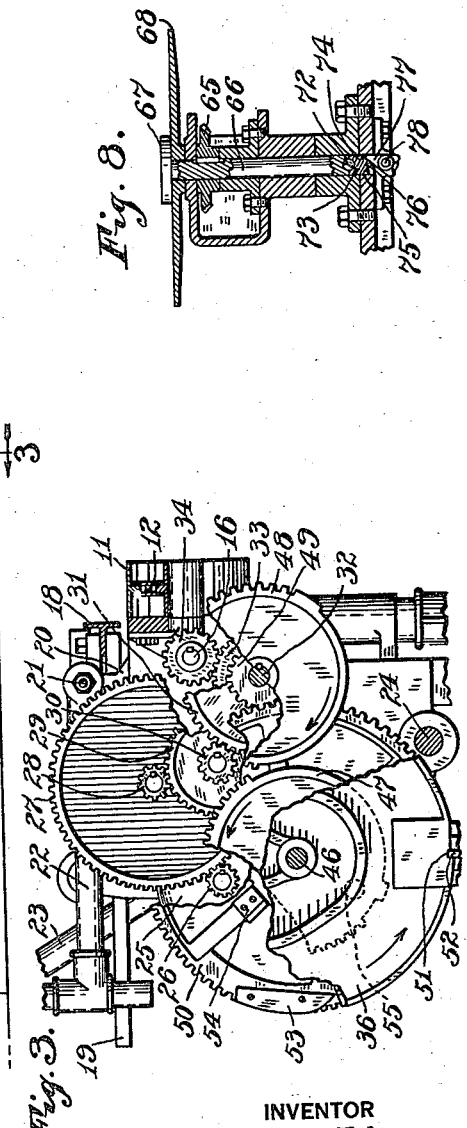
INVENTOR
William H. Johnson,
BY
Arthur M. Hood.
ATTORNEY Sept. 16, 1924.
W. H. JOHNSON
LEER FEEDER
Filed Jan. 25, 1923  4 Sheets-Sheet 3
1,509,063
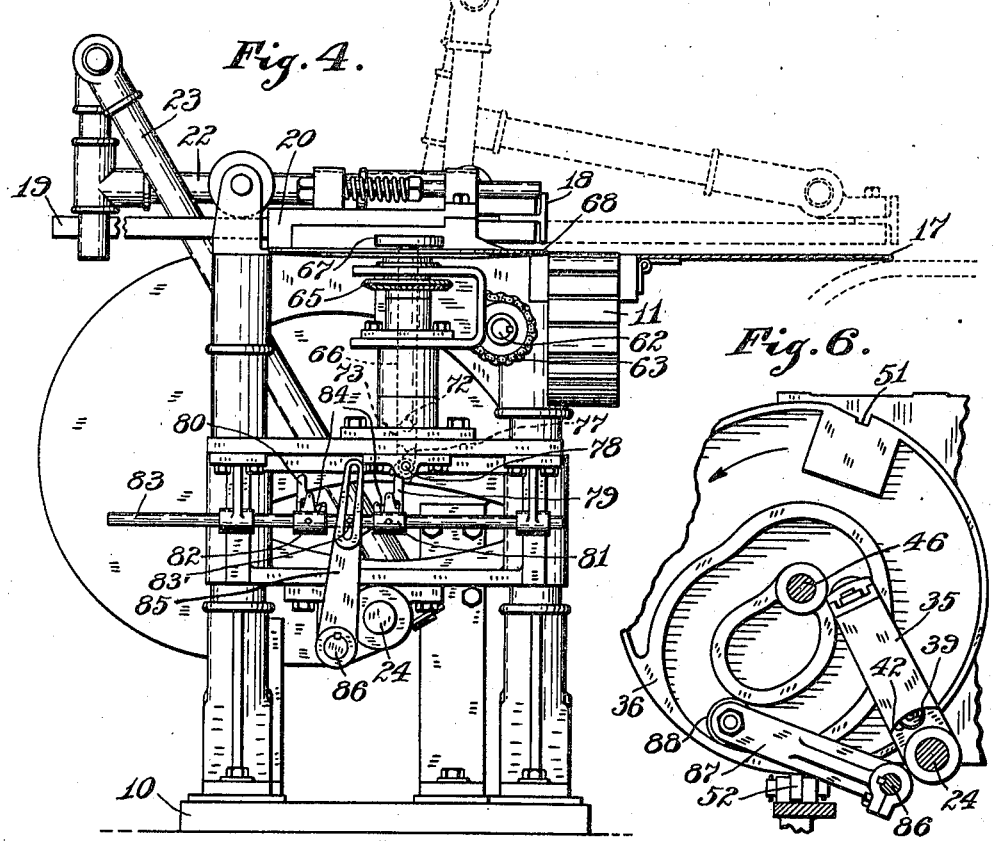
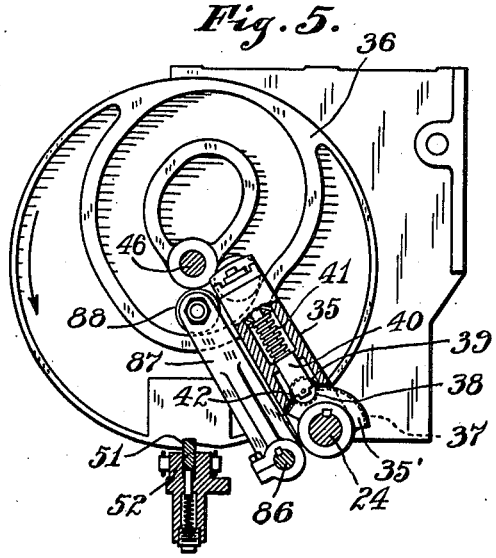
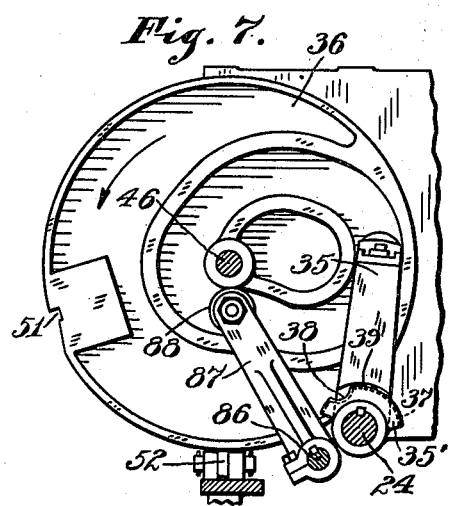
INVENTOR
William H. Johnson,
BY
Arthur M. Hood.
ATTORNEY Sept. 16, 1924.
W. H. JOHNSON
LEER FEEDER
Filed Jan. 25, 1923
1,509,063
4 Sheets-Sheet 4
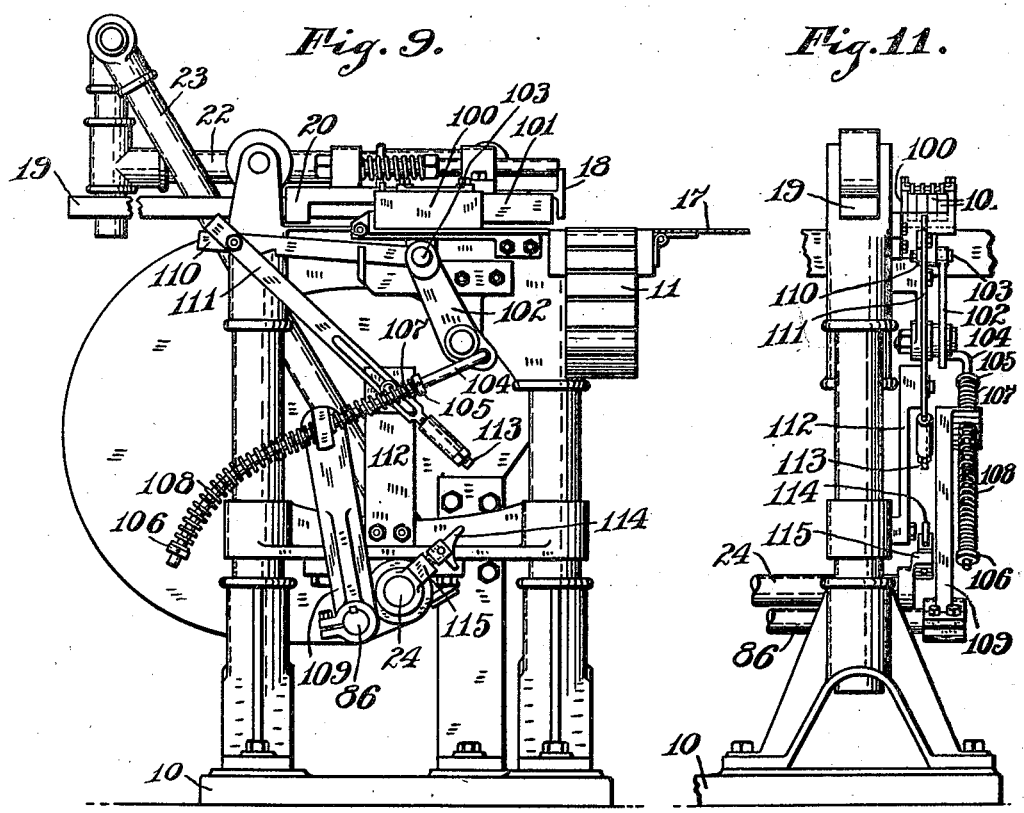
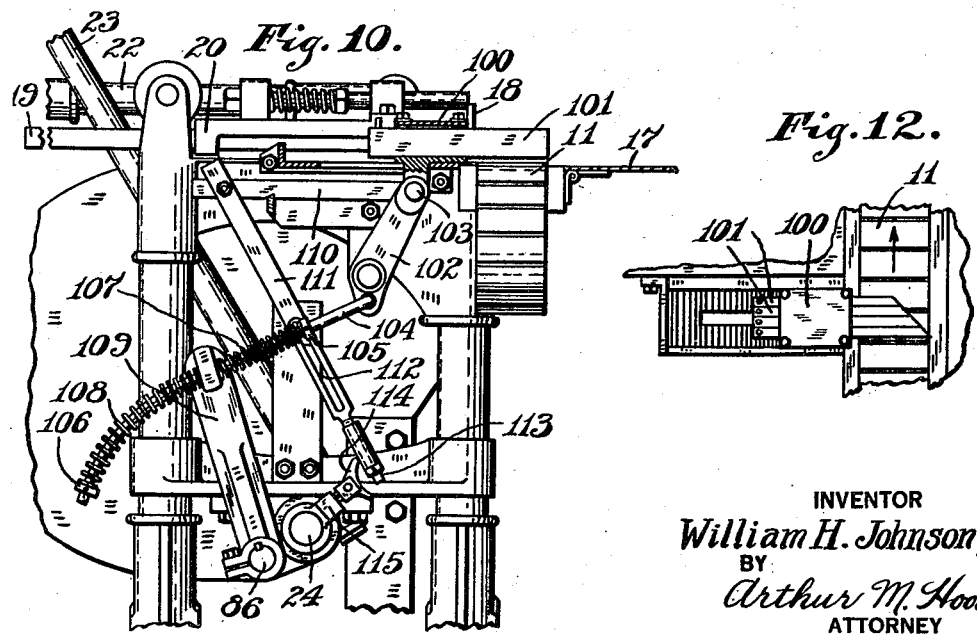
INVENTOR
William H. Johnson,
BY
Arthur M. Hood.
ATTORNEY Patented Sept. 16, 1924.

1,509,063

UNITED STATES PATENT OFFICE.

WILLIAM H. JOHNSON, OF TERRE HAUTE, INDIANA, ASSIGNOR TO AUTOMATIC MACHINERY COMPANY, OF TERRE HAUTE, INDIANA, A CORPORATION OF INDIANA.

LEER FEEDER.

Application filed January 25, 1923. Serial No. 615,423.

*To all whom it may concern:*

Be it known that I, WILLIAM H. JOHNSON, a citizen of the United States, residing at Terre Haute, in the county of Vigo and State of Indiana, have invented a new and useful Leer Feeder, of which the following is a specification.

The object of this invention is to produce a compact and efficient leer feeder by means of which a stream of freshly formed glass articles may be automatically delivered into a leer. While the apparatus is primarily designed for the purpose above specified, it will be understood, of course, that it may be used for similarly handling other articles.

The accompanying drawings illustrate my invention: Fig. 1 is a plan in partial horizontal section of the improved apparatus; Fig. 2, an elevation; Fig. 3, a detail, in partial vertical section, on line 3—3 of Fig. 2; Fig. 4, an end elevation; Fig. 5, a detail of the primary cam and associated parts; Fig. 6, a view similar to Fig. 5 with the parts in a different position; Fig. 7, a view similar to Figs. 5 and 6 with the cam in advanced position and the pusher-operating arm in the position which might be occupied in case of accident; Fig. 8, a fragmentary vertical section through the axis of the transfer disk; Fig. 9, an end elevation of another means for interrupting the flow of articles to the belt 11; Fig. 10, a view similar to Fig. 9 with some of the parts in vertical section and the parts moved to flow stopping position; Fig. 11, a front elevation of the parts shown in Fig. 9 and Fig. 12, a fragmentary plan.

In the drawings, 10 indicates a suitable supporting frame, upon which is supported, upon suitable ways, an endless conveyor belt 11 having an upper carrying surface of such character as to properly support the freshly formed hot glass ware and to slip beneath the same if the flow of ware is interruped. Belt 11 is supported by suitable sprocket wheels 12, 12, provided with a shaft 13 having a bevelled gear 14 which meshes with a driving pinion 15 carried by shaft 16. Along one side, belt 11 is flanked by a bridge plate 17.

Arranged along the other side of belt 11 is a push bar 18 carried at the forward ends by a pair of slides 19, 19 slidably mounted in suitable ways 20 on frame 10.

Pivoted at 21, 21 to push bar 18 are pitmen 22, 22 which are pivoted to the outer end of arms 23, 23 carried by a rock shaft 24.

The motor 25 has its pinion 26 meshing with the gear 27 which, through a train of reducing gears 28, 29, 30 and 31, continuously rotates countershaft 32 which carries a gear 33 meshing with a gear 34 on shaft 16, so that the conveyor 11 is continuously driven in the direction indicated by the arrow in Fig. 1.

Rock shaft 24 is reciprocated by means of an arm 35 and cam 36. The arm 35 is yieldingly locked to shaft 24 by means of the construction illustrated in Fig. 5.

The arm 35 is arranged along side of the said metal flange 35' carried by shaft 24, said flange being provided with a circumferential groove 37 (dotted lines Fig. 5), and a transverse notch 38. Normally seated in the transverse notch 38 is a roller 39 carried by plunger 40 mounted in arm 35 and backed by spring 41. The roller 39 is provided with a circumferential rib 42 which is capable of seating in the groove 37 in flange 35' so as to keep the parts in registry.

The above described arrangement is to permit movement of rock shaft 24 in case the push bar 18 is obstructed in its forward motion.

Cam 36 rotates upon a fixed shaft 46 and carries a mutilated gear 47 which is aligned with a mutilated gear 48 keyed to shaft 32. Gear 49, keyed to shaft 32, meshes with a timing gear 50 which rotates freely on shaft 46 along side of the mutilated gear 47.

Cam 36 is provided with a locking notch 51 so located as to place cam 36 in position to normally hold the push bar 18, in the postion shown in Fig. 1 and said notch is formed to receive a spring catch 52 mounted in frame 10, said catch being intermittently withdrawn from the notch by means of a cam 53 carried by the timing gear 50, said cam 53 retracting the catch just as a block 54, carried by the timing gear 50, comes into contact with a pin 55 carried by gear 47, the arrangement being such that gear 47 is advanced, from its normal, at rest, position at a proper time, during one of the rotations of shaft 32, to be engaged by the forward end of the mutilated tooth series on gear 48.

The gears are so proportioned that the push bar 18 will be moved quickly transversely of the carrier 11 and quickly returned to initial position, at desired intervals, the period of these intervals depending upon the character of the ware which is to be handled.

Shaft 32 carries a gear 60 meshing with gear 61 on shaft 62, similar to shaft 16, and connected, by sprocket chain connection 63 and bevel gear 64 with a bevel gear 65 through which is splined a shaft 66 carrying a friction head 67 at its upper end. Journaled in frame 10 and around shaft 66 is a transfer disk 68, which is arranged in the corner between the receiving end of conveyor 11 and the delivery end of a similar conveyor 69, guiding fences 70 and 71 being arranged over the conveyors and disk in the usual manner.

During the period when the push bar 18 is moving laterally across conveyor 11 and returning to its initial position, the flow of ware to conveyor 11 must be interrupted, and in this form of apparatus this interruption is obtained by a timed stopping of disk 68, this being accomplished by withdrawing friction head 67 from contact with the disk.

For this purpose, the lower end of shaft 66 rests upon a ball 72 which is carried by a vertically movable block 73 formed at its lower end into two steps 74 and 75 separated by an intermediate rib 76. Block 73 rests upon a swinging support 77 pivoted at 78 on the main frame and formed at its lower end to cooperate with a pair of actuating fingers 79 and 80 which are pivotally supported on adjustable heads 81 and 82, adjustably mounted on a reciprocating rod 83. Movement of the fingers 79 and 80 on their carrying heads 81 and 82 is permitted in one direction and limited in the opposite direction by means of spring mountings 84, 84, the arrangement being such that fingers 79 and 80 may pass the swinging support 77 in one direction but will swing support 77 when moving in the opposite direction. Rod 83 is reciprocated by means of a slotted arm 85 engaging a pin 83' and carried by a rock shaft 86. The rock shaft 86 is provided with an arm 87 carrying a roller 88 taking into the same cam groove of cam 36, which operates arm 35.

Bridge plate 17 carries, at its receiving end, a guard 90 which limits the spread of ware in one direction, and a guard 91 which controls the spread of ware at the opposite end of the plate, said guard 91 being projected across the conveyor 11 so as to limit the flow of articles on the conveyor.

The apparatus which has been described is so formed as to be placed, as a unit, at the mouth, or receiving end, of a leer, the bridge plate 17 extending to the upper face of the ware-receiving belt or plates of the leer.

The operation is as follows:

Ware arriving on conveyor 69 will be transferred therefrom to conveyor 11 by the combined action of the conveyors, fences 70 and 71, and disk 68 and this flow will continue until the desired quantity of ware has arrived upon belt 11 in front of push bar 18, whereupon latch 52 will have been withdrawn and block 54, acting upon pin 55, will bring gear 47 into mesh with gear 48. The first action of cam 36 will be to swing arm 87 to the position shown in Fig. 6, arm 35, in the meantime, remaining stationary. This will bring arm 85 to the position shown in Fig. 4, and, at the end of the stroke, will have moved finger 79 under the swinging support 78 to bring it to the position shown in Fig. 4, at which time it will have passed over rib 77 so as to support block 73 high enough to hold friction head 67 out of contact with disk 68, thereby stopping the flow of ware from disk 68 to conveyor 11. As soon as all ware upon conveyor 11 has been carried sufficiently in front of push bar 18, cam 36 will serve to swing arm 35 to the position shown in Fig. 7, thus projecting push bar 18 laterally across conveyor 11 to the position indicated in dotted lines in Fig. 4, and arm 85 will be swung, to the right in Fig. 4, until finger 80 passes beneath support 78 and swings it to position where block 73 will be supported on step 74 and permit friction head 67 to come in contact with disk 68 and start it into movement.

The time required for ware to flow from the freshly started disk 68 on the conveyor 11 and to reach the initial end of push bar 18 is sufficient to permit enough forward movement of cam 36 to bring arm 35 back to the position shown in Fig. 5, and thus bring the push bar 18 back to its normal position, as shown in full lines in Fig. 4.

The purpose of disk 68, and its controlling mechanism, is to synchronize the flow of articles to belt 11 with the movements of the pusher bar 18 and it will be readily understood that this flow may be synchronized by other mechanism.

In Figs. 9 to 12 inclusive, I show another mechanism for accomplishing this purpose for which suitable claims have been made in my co-pending application filed January 25, 1923, Serial No. 615,425.

In these figures there is substituted, for the mechanism for stopping and starting the transfer disk, a stop finger mechanism which is intermittently projected across the belt 11 at its receiving end. This stop finger mechanism comprises a reciprocating carrier 100 carrying a plurality of independently movable stop fingers 101 of the character disclosed in the Purcell Patent 1,431,895 and is here illustrated merely as a satisfactory form of dam or stop finger capable of arresting the movement of articles along with belt 11.

Carrier 100 is reciprocated by means of a lever 102 connected by pin and slot connection 103 with the carrier and shifted through the medium of a pitman 104 provided with a pair of abutments 105 and 106 for a pair of balanced springs 107 and 108, an arm 109 carried by shaft 86, lying between the two springs. When arm 109 is moved to the left, from the position shown in Fig. 9, it serves to project fingers 101 across the face of belt 11 and bring the catch 110 to locking position, shown in Fig. 10, thereby holding carrier 100 and the stop finger 101 in the position shown in Fig. 10 during a period of return of shaft 86 and arm 109, this period of return serving to compress spring 107. The movement of catch 110 to the position shown in Fig. 9 shifts the releasing link 111 to the position shown in Fig. 10. This releasing link is pivotally connected at its upper end to catch 110 and has a pin and slot support 112 on the main frame. Its lower end is provided with an adjustable foot 113 adapted to be engaged, upon the counter-clockwise movement of the shaft 24, by a pawl 114 pivotally supported upon an arm 115 carried by the shaft 24, the arrangement being such that, as shaft 24 returns to its normal, at rest, position, shown in Fig. 5, the pawl 114 will be brought up against foot 113, so as to raise catch 110 from engagement with the frame, and permit spring 107 to suddenly retract the stop finger from the above belt 11 and thus permit flow of articles along this belt to be resumed as soon as the push bar 18 has been returned to its normal, at rest, position by the action of cam 36 on arm 35.

In this form, the transfer disk 68 is used but it is continuously driven and the mechanism illustrated in Fig. 4 for intermittently disconnecting the driving force from the disk, is, of course, omitted.

I claim as my invention:

1. In a leer feeder, a carrier for bringing ware to the mouth of the leer, a push bar arranged along side the carrier, a pair of parallel rock shafts, an arm mounted on one of said shafts and arranged to actuate said bar to cause the same to intermittently sweep across the carrier and return, an operating cam, a second arm mounted upon said rock shaft and actuated by said operating cam, an arm mounted on said second rock shaft and actuated by said cam, a second arm mounted on said second rock shaft and means synchronized with the push bar for intermittently interrupting the flow of articles on the carrier to position in front of said push bar operated by the second arm mounted on said second shaft.

2. In a leer feeder, a carrier for bringing ware to the mouth of a leer, a push bar arranged alongside the carrier, means for intermittently sweeping the push bar laterally across the carrier and return, comprising a cam and intermediate actuating means operated by the cam, means for delivering a stream of articles to the initial end of the carrier, and means synchronized with the push bar for intermittently interrupting flow of articles on the carrier to position in front of the push bar, said means comprising a transfer disk, separable driving means for said disk, and an element for alternately establishing and disestablishing driving connection with the disk in synchronism with the push bar.

3. In a leer feeder, a carrier for bringing ware to the mouth of a leer, a push bar arranged alongside the carrier, means for intermittently sweeping the push bar laterally across the carrier and return, comprising a cam and intermediate actuating means operated by the cam, means for delivering a stream of articles to the initial end of the carrier, and means synchronized with the push bar for intermittently interrupting flow of articles on the carrier to position in front of the push bar, said means comprising a transfer disk, separable driving means for said disk, and an element acted upon by the cam for alternately establishing the disestablishing driving connection with the disk in synchronism with the push bar.

4. In a leer feeder, a carrier for bringing ware to the mouth of a leer, a push bar arranged alongside the carrier, a driving train for driving the carrier, a rock shaft, connections between said rock shaft and the push bar, a cam, connections between said rock shaft and cam, and intermittently-acting driving means between the driving train and cam for intermittently operating the cam in synchronism with the carrier.

5. In a leer feeder, a carrier for bringing ware to the mouth of a leer, a push bar arranged alongside the carrier, a driving train for driving the carrier, a rock shaft, connections between said rock shaft and the push bar, a cam, connections between said rock shaft and cam, intermittently-acting driving means between the driving train and cam for intermittently operating the cam in synchronism with the carrier, means for delivering a stream of articles to said carrier, and means synchronized with the push bar through the medium of the cam, for intermittently interrupting the flow of articles on the carrier into position in front of the push bar.

6. In a leer feeder, a carrier for bringing ware to the mouth of a leer, a push bar arranged alongside the carrier, a driving train for driving the carrier, a rock shaft, connections between said rock shaft and the push bar, a cam, connections between said rock shaft and cam, intermittently-acting driving means between the driving train and cam for intermittently operating the cam in synchronism with the carrier, means for delivering a stream of articles to said carrier, and means synchronized with the push bar for intermittently interrupting the flow of articles on the carrier into position in front of the push bar.

7. In a leer feeder, a carrier for bringing ware to the mouth of a leer, a push bar arranged alongside the carrier, a driving train for driving the carrier, a rock shaft, connections between said rock shaft and the push bar, a cam, connections between said rock shaft and cam, intermittently-acting driving means between the driving train and cam for intermittently operating the cam in synchronism with the carrier, a horizontally rotatable transfer plate arranged at the initial end of the carrier, means for driving said transfer plate comprising a separable driving connection, and means for intermittently separating and establishing said driving connection in synchronism with the movements of the push bar, said means comprising a rock shaft controlled by said cam.

8. In a leer feeder, a carrier for bringing ware to the mouth of a leer, a push bar arranged alongside the carrier, a driving train for driving the carrier, a rock shaft, connections between said rock shaft and the push bar, a cam, connections between said rock shaft and cam, intermittently-acting driving means between the driving train and cam for intermittently operating the cam in synchronism with the carrier, a horizontally rotatable transfer plate arranged at the initial end of the carrier, means for driving said transfer plate comprising a separable driving connection, and means for intermittently separating and establishing said driving connection in synchronism with the movements of the push bar.

9. In a leer feeder, a carrier for bringing ware to the mouth of a leer, a push bar arranged alongside the carrier, a driving train for driving the carrier comprising a countershaft, a timing gear driven from said countershaft, a cam associated with said timing gear, one-way interengaging means between the timing gear and cam whereby the timing gear may advance the cam and the cam may advance independently, a pair of mutilated gears carried by the cam and countershaft and brought into active co-relation by the timing gear, and connections between the cam and push bar for intermittently reciprocating the push bar.

10. In a leer feeder, a carrier for bringing ware to the mouth of a leer, a push bar arranged alongside the carrier, means for intermittently reciprocating the push bar laterally across the carrier, a horizontally rotatable transfer disk arranged at the initial end of the carrier to deliver a stream of articles to said carrier, a driving train for said transfer disk comprising an axially arranged friction head, and means for shifting said friction head into and out of co-action with the disk.

11. In a leer feeder, a carrier for bringing ware to the mouth of a leer, a push bar arranged alongside the carrier, means for intermittently reciprocating the push bar laterally across the carrier, a horizontally rotatable transfer disk arranged at the initial end of the carrier to deliver a stream of articles to said carrier, a driving train for said transfer disk comprising an axially arranged friction head, and means for shifting said friction head into and out of co-action with the disk, said means comprising a shiftable supporting member and a pair of one-way-acting triggers.

12. An article-transporting device comprising a horizontally rotatable transfer disk, a friction head for driving said disk, a driving train for said friction head, a swinging support for shifting said friction head into and out of active position relative to the transfer disk, a reciprocating bar arranged adjacent said support, a pair of one-way-acting triggers carried by said bar and adapted to shift said support to its alternate positions, and means for reciprocating said bar.

13. In a leer feeder, a carrier for bringing ware to the mouth of a leer, a push bar arranged alongside the carrier, a rock shaft, means for connecting said rock shaft to the push bar to cause the same to intermittently sweep laterally across the carrier and return, an operating cam and an arm actuated by said cam and releasably connected to said rock shaft and operating the same.

In witness whereof, I have hereunto set my hand at Terre Haute, Indiana, this 17 day of December, A. D. one thousand nine hundred and twenty two.

WILLIAM H. JOHNSON.